United States Patent [19]
Gilbert

[11] Patent Number: 5,343,960
[45] Date of Patent: Sep. 6, 1994

[54] CATERPILLAR TRACK ATTACHMENT

[75] Inventor: Sylvain Gilbert, Roberval, Canada

[73] Assignee: Les Equipements Industriels, Roberval, Canada

[21] Appl. No.: 941,970

[22] Filed: Sep. 8, 1992

[51] Int. Cl.⁵ .................. E02F 3/76; B62D 55/00
[52] U.S. Cl. .................... 172/823; 172/811; 172/822; 172/264; 172/826; 180/921; 180/926
[58] Field of Search ............... 180/9.21, 9.26; 172/811, 822, 823, 824, 825, 826, 264, 265, 266, 705, 643

[56] References Cited

U.S. PATENT DOCUMENTS

| | | | |
|---|---|---|---|
| 1,073,759 | 9/1913 | Huck | 172/264 |
| 1,665,470 | 10/1928 | Norelius | |
| 1,810,138 | 6/1931 | Kincannon | |
| 2,794,273 | 6/1957 | Pilkington et al. | 172/823 |
| 3,321,027 | 5/1967 | Johnson et al. | 172/264 |
| 3,710,886 | 8/1973 | Wagner | 180/9.2 |
| 3,939,930 | 2/1976 | Firstenberg | 180/9.21 |
| 3,976,153 | 8/1976 | Lateur | 180/9.2 |
| 4,448,273 | 6/1984 | Barbieri | 180/9.21 |
| 4,727,948 | 3/1988 | Julseth | 180/9.26 |
| 4,821,824 | 4/1989 | Gilbert | 180/9.28 |
| 4,865,141 | 9/1989 | Gey | 180/9.26 |

*Primary Examiner*—Clifford D. Crowder
*Assistant Examiner*—Bibhu Mohanty
*Attorney, Agent, or Firm*—Collard & Roe

[57] ABSTRACT

The caterpillar track attachment is provided for a vehicle having a drive shaft and a steering mechanism. The attachment comprises a pair of endless caterpillar tracks for propelling the vehicle, a frame for supporting the vehicle, drive devices to be operatively connected to the drive shaft and engaging the tracks for transmitting motive power from the drive shaft to the tracks, and a hydraulic device to be coupled to the steering mechanism for providing at least one hydraulic fluid outlet controlled by commands from the steering mechanism. The frame has securing devices for connecting the vehicle onto the frame, and a pair of spaced apart elongated side members around which the tracks are respectively mounted. Each of the members has front and rear sets of wheels located substantially at its front and rear extremities for guiding therearound the corresponding track, and straight slides located at its lower portion between the corresponding rear and front sets of wheels for guiding the corresponding track. The attachment can be adapted to the vehicle by connecting operatively the drive devices to the drive shaft, by connecting the frame to the vehicle by the securing devices, and by coupling the steering mechanism to the hydraulic device.

18 Claims, 11 Drawing Sheets

CATERPILLAR TRACK ATTACHMENT

BACKGROUND OF THE INVENTION

1. Field of the Invention

The invention relates to caterpillar track vehicle propulsion and more specifically to a heavy duty caterpillar track attachment to be adapted to a vehicle having a drive shaft and a steering mechanism.

2. Description of the Prior Art

Known in the art is U.S. Pat. No. 1,665,470 which describes a rear-end assembly for power driven vehicles, more specifically tractors. The rear-end assembly comprises a transmission mechanism adapted to receive the motive power from the differential of the vehicle, and to transmit it to a pair of rear drive wheels driving a pair of caterpillar tracks. It is assumed that the vehicle had been originally designed to undergo this transformation by having a special corresponding front assembly that is suitable to cooperate with the rear-end assembly. Therefore, if such a front assembly was not previously designed for that purpose, the rear-end assembly cannot be installed on the vehicle. The rear drive mechanism of the vehicle has to be mostly replaced by the rear-end assembly which comprises several moving or rotative parts that might as well be subjected to possible breakdown, reducing thereby the reliability of the assembly.

Also known in the art is U.S. Pat. No. 3,710,886 which describes a mechanism for converting a wheeled vehicle into a tracked vehicle. The mechanism comprises a pair of track assemblies adapted to be connected to the brake drums of the vehicle in replacement of the normal four wheels. The steering mechanism of the vehicle is further implemented through the brake system of the vehicle for controlling braking of the tracks to steer the vehicle. Such mechanism requires a complicated installation which leads to the track conversion. Furthermore, the whole weight of the vehicle is carried by adaptors joining the track assemblies to the wheels, therefore requiring very strong adaptors that will not be any way suitable for labor on soft or uneven grounds, especially for working the soil or the snow.

Also known in the art is U.S. Pat. No. 4,865,141 which describes a device for changing a vehicle provided with wheels into a track vehicle. The device resembles the one described in U.S. Pat. No. 3,710,886 above-mentioned. However, the two track aggregates are attached to the rims of the wheels of the vehicle instead of the brake drums, and this without the removal of the vehicle wheels. Although the construction of the aggregates also differs slightly from the prior one, the same drawbacks are observed.

Also known in the art are U.S. Pat. Nos. 1,810,138, 2,356,931, 3,976,153, 4,448,273 and 4,821,824 which all describe different kinds of caterpillar track devices providing track propulsion for a vehicle. However, all of these devices somehow or other require difficult installation, are intended for only some of the wheels of a vehicle and thus lacks stability on soft ground, and comprise various easily breakable structural parts that prevent such devices from being used for heavy work.

It is also worth mentioning that most of the prior art devices, when guiding the tracks from one extremity to the other, are provided with sets of idler wheels. Such idler wheels are in a way costly and do not necessarily represent the best means to perform this purpose.

OBJECT OF THE INVENTION

It is therefore an object of the present invention to provide a caterpillar track attachment, to be adapted to a vehicle having a drive shaft and a steering mechanism, which is easily installed, suitable for a large number of vehicle types and reliable for heavy-duty tasks.

Another object of the invention is to provide such an attachment with reduced cost in built-up while maintaining strongness for heavy work possibilities.

Another object of the invention is to provide such an attachment with slides instead of the conventional idler wheels for guiding the portion of the tracks on the ground.

SUMMARY OF THE INVENTION

According to the present invention, there is provided a caterpillar track attachment to be adapted to a vehicle having a drive shaft and a steering mechanism, comprising:

- a pair of endless caterpillar tracks for propelling said vehicle;
- a frame for supporting said vehicle, said frame having securing means for connecting said vehicle onto said frame, and a pair of spaced apart elongated side members around which the tracks are respectively mounted, each of said members having front and rear sets of wheels located substantially at its front and rear extremities for guiding therearound the corresponding track, and straight slide means located at its lower portion between the corresponding rear and front sets of wheels for guiding the corresponding track;
- drive means for transmitting motive power from said drive shaft to said tracks, said drive means being operatively connectable to said drive shaft and engaging said tracks; and
- hydraulic means to be coupled to said steering mechanism for providing at least one hydraulic fluid outlet controlled by commands from said steering mechanism;

whereby said attachment can be adapted to said vehicle by operatively connecting said drive means to said drive shaft, by connecting said frame to said vehicle by said securing means, and by coupling said steering mechanism to said hydraulic means.

Preferably, the attachment comprises a rear beam provided with a pair of brackets extending rearwards therefrom for hitching up a plow to said attachment, and said hydraulic fluid outlet is positioned close to said pair of brackets for connecting a hydraulic accessory of said plow to said outlet.

Preferably, the attachment is also in combination with the plow, wherein said plow as a grading blade provided with retractile and inclination systems.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF PREFERRED EMBODIMENTS OF THE INVENTION

Figure 1:
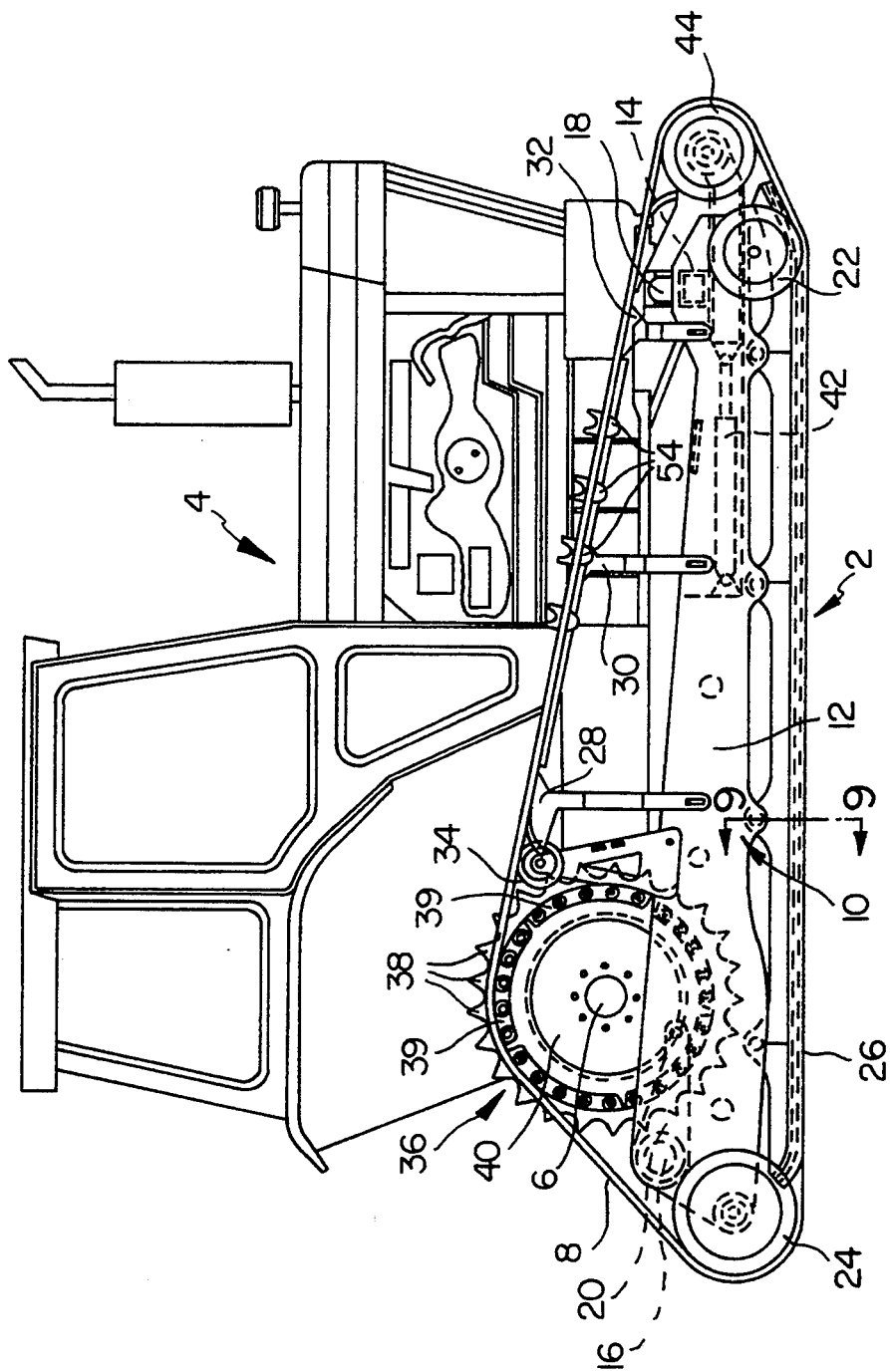
FIG. 1 is a side elevational view of a vehicle to which is adapted thereto a first embodiment of a caterpillar track attachment according to the present invention.

In the following description and in the drawings, same numerals refer to corresponding elements. The embodiments of the caterpillar track attachment shown in the Figures are particularly suitable for snow grooming vehicles on ski slopes or skidoo trails. Hence, the following description will be made in relation with a caterpillar track attachment provided for a snow grooming type of vehicle, although such attachment can be provided as well for other type of vehicle and for other tasks.

Referring now to FIG. 1, a first embodiment of a caterpillar track attachment 2 is adapted to a tractor 4 having a rear drive shaft 6 and, as most of vehicles are provided with, a steering mechanism (not shown in the Figure) used for normally steering the tractor 4. The attachment 2 comprises a pair of endless caterpillar tracks 8 respectively on each side of the tractor 4 for propelling it instead of the usual wheels. The attachment also comprises a frame 10 for supporting the tractor 4. The frame 10 is formed by a pair of spaced apart elongated side members 12, a front transverse beam 14 (shown in dotted lines) and a rear transverse beam 16 (shown in dotted lines) that join each of the side members 12 and fix it all firmly together. The tractor 4 is secured to the attachment 2 on these front and rear beams 14 and 16. The front beam 14 forms a groove especially adapted to receive the front axle 18 of the tractor 4 so that it is tightly fitted in. The rear beam 16 is provided with a pair of hooks 20 (shown in dotted lines) for securing thereto the rear portion of the tractor 4 by bolting these hooks 20 to corresponding hooks (not shown in the Figure) of the tractor 4.

Each of the tracks 8 is mounted around the corresponding one of the side members 12. For this purpose, each of the side members 12 is provided with front and rear sets of coaxially aligned idler wheels 22 and 24 for guiding therearound the corresponding track, and a straight slide 26 made of TEFLON (Trade Mark) located at its lower portion between the front and rear sets of idler wheels 22 and 24 for guiding the corresponding track 8 during its course. Each of the side members 12 has also at its upper portion three other shorter slides 28, 30 and 32 made of TEFLON and a pair of idler wheels 34 beside the sprocket wheel 36 engaging the corresponding track to guide it during its course between the sprocket wheel 36 and the front set of idler wheels 22.

To transmit motive power from the drive shaft 6 of the tractor 4 to the tracks 8, the sprocket wheels 36 are fixedly attached at both ends of the drive shaft 6 respectively in direct linkage therewith and in a gearing engagement with the tracks 8. The motive power could be transmitted from the drive shaft 6 to the sprocket wheels 36 in various way, such as with coupling gears or belts, allowing to locate the rotation axis of the sprocket wheels 28 at any convenient place for their purpose. Each of the tracks 8 has along its entire length tooth-receiving holes set equally apart, that can be engaged by the teeth 38 of the sprocket wheel 36.

Figure 4:
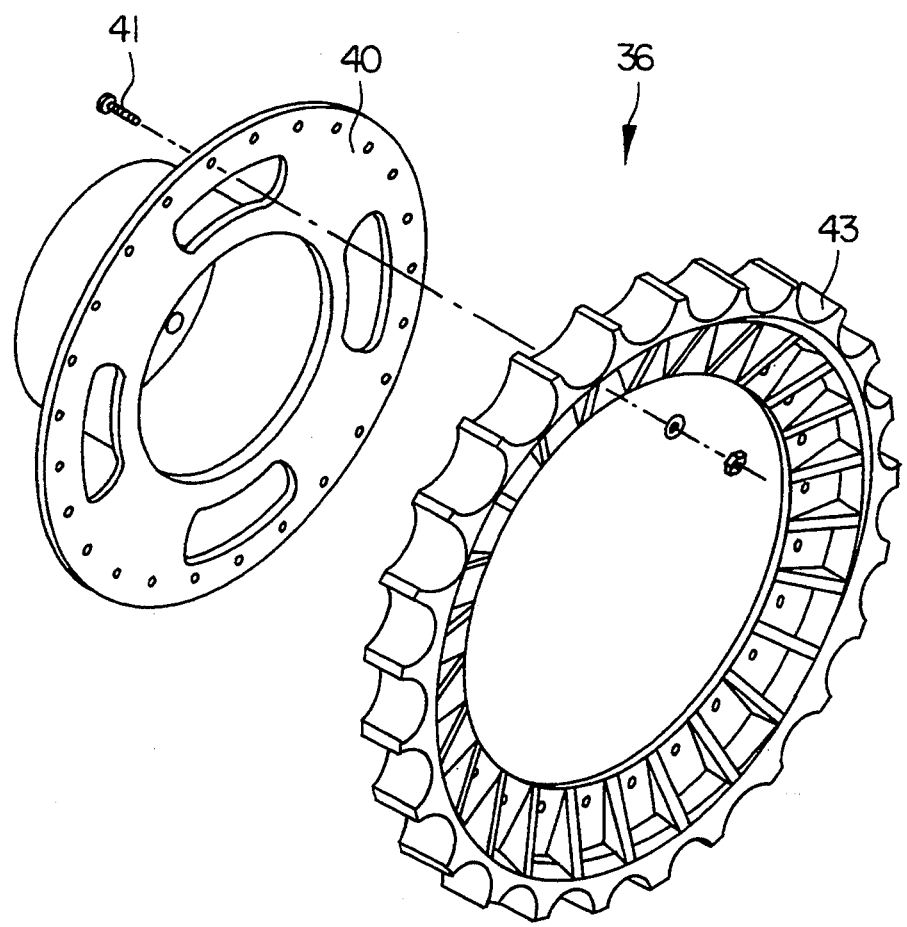
FIG. 4 is an enlarged exploded view of the sprocket wheel shown in FIG. 2.

Each of the sprocket wheels 36 has a one-piece hub 40 around which are mounted five arc pieces 39 forming a rim, each of the arc pieces 39 being provided with a group of the teeth 38 that form the entire set of teeth of the sprocket wheel 36 when all the arc pieces 39 are mounted around the hub 40. Installation of the sprocket wheels 36 is made easier as each of its pieces 39, 40 is relatively light, instead of a heavy one-piece sprocket wheel. As shown in FIG. 4, the sprocket wheel 36 might as well be formed of a one-piece hub 40 around which is mounted with bolts 41 a one-piece rim 43 provided with the entire set of teeth. The rim 43 is made of a polyurethane plastic and an aluminum alloy, thereby providing the same advantages as the prior embodiment of the sprocket wheel 36 while straightening the rim 43 for heavy work.

Referring again to FIGS. 1 and 2, to adjust the stretch of the tracks 8, each of the side members 12 has a stretch adjuster formed by a telescopic arm 42 having an end connected to the corresponding side member 12, and a pair of coaxially aligned idler wheels 44 attached to an opposite end of the arm 42. The stretch is simply adjusted by positioning longitudinally the idler wheels 44 to press up against the corresponding track 8 for producing the desired stretch thereof.

Figure 2:
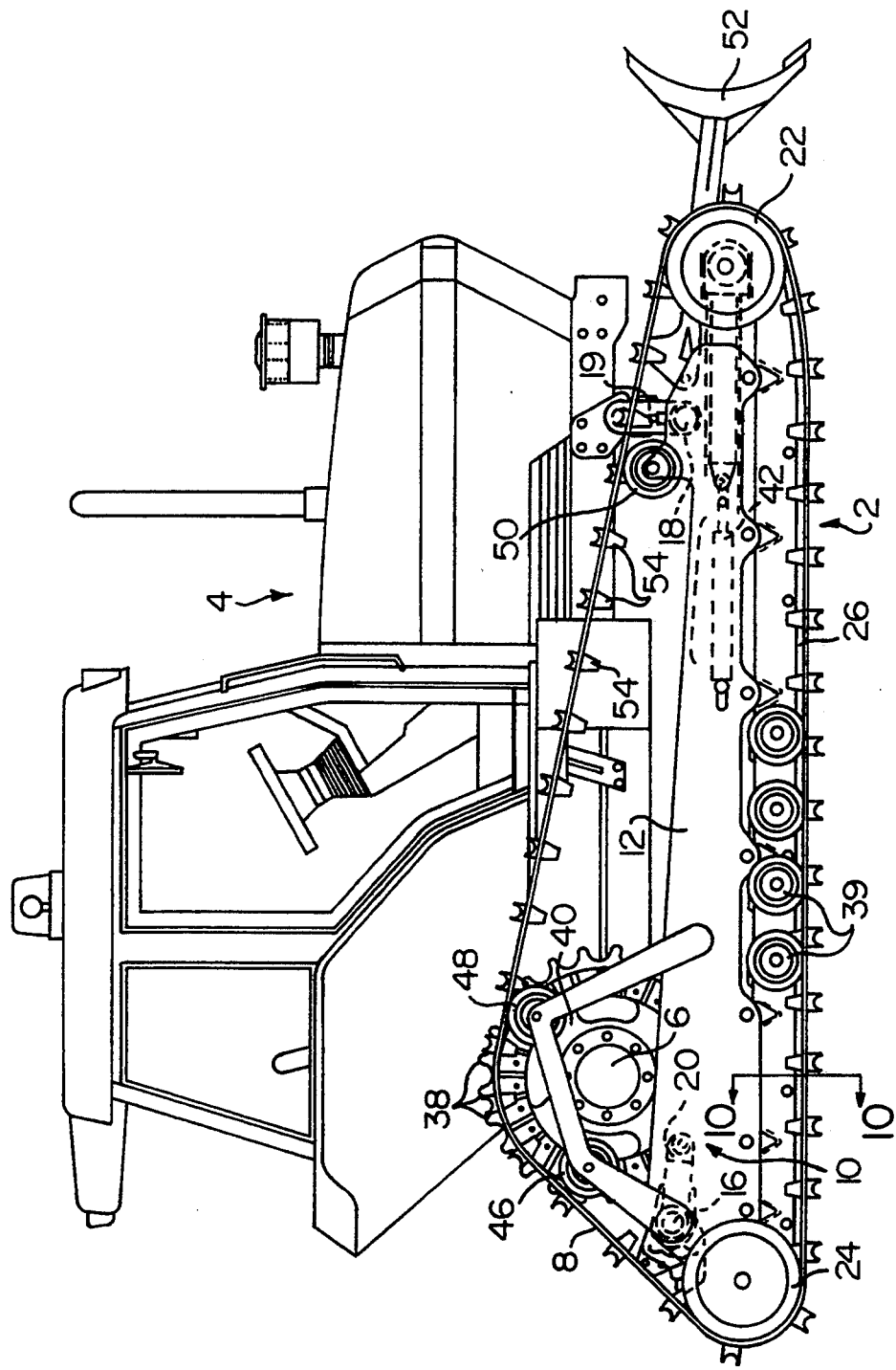
FIG. 2 is a side elevational view of a vehicle to which is adapted thereto a second embodiment of a caterpillar track attachment according to the present invention.

Referring now to FIG. 2, there is shown another embodiment of the attachment 2 that differs slightly from the one shown in FIG. 1 in that pairs of coaxially aligned idler wheels 46, 48, 50 are use to guide the tracks 8 on the upper portion of the side members 12, instead of the prior slides 28, 30, 32 (shown in FIG. 1). Two of these pairs of wheels 46 and 48 are positioned on proximity of each sprocket wheel 36 near the locations where the track 8 is engaged and disengaged. Instead of using a second set of idler wheels 44 (shown in FIG. 1) for adjusting the track stretch, each of the side members 12 is provided with a front set of bigger idler wheels 22 directly attached to the front end of the telescopic arm 42 forming the stretch adjuster.

The front transverse beam 18 is provided with coupling elements 19 for connecting the front part of the tractor 4 to the attachment 2.

It might be desirable to provide the slides 26 with sets of track-bearing idler wheels 39 attached at predetermined locations on both sides of the slides 26 on their lower portion. Such sets of track-bearing idler wheels 39 limit the wear of the slides 26 on hard ground such as public and forestry roads which may need to be crossed during operation. Various accessories can be affixed to the attachment 2, such as a front plow 52.

Figure 3:
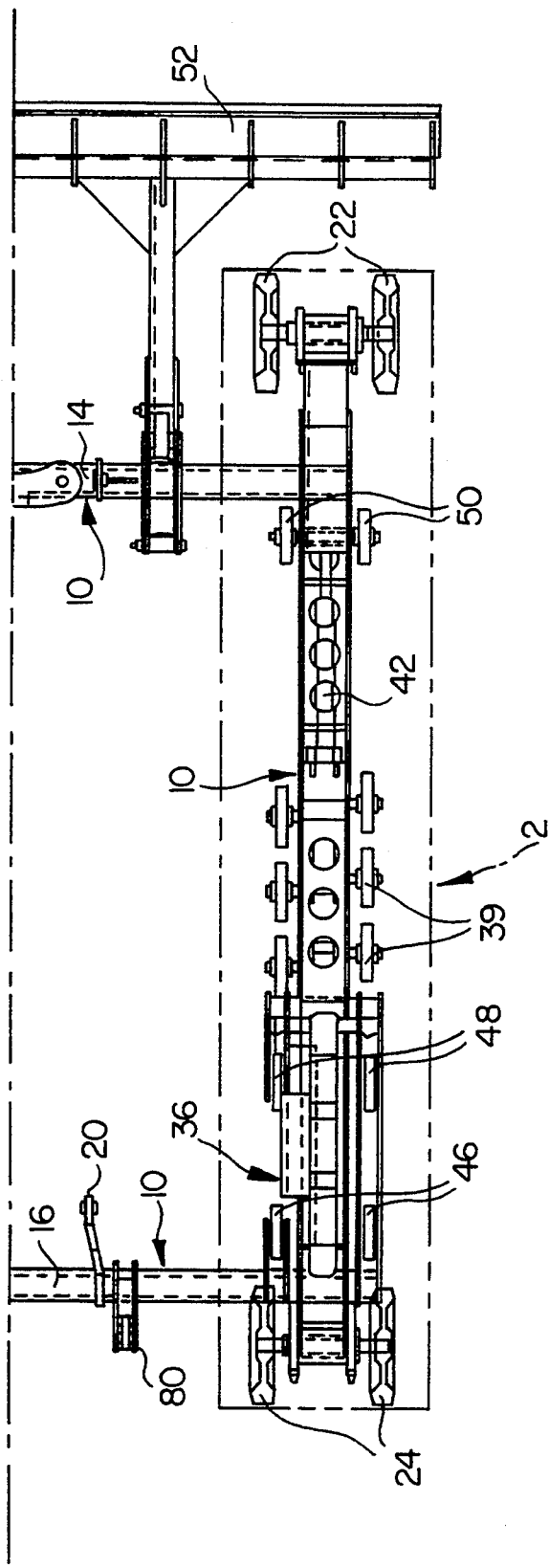
FIG. 3 is a top plan view of a half portion of the attachment shown in FIG. 2.

Referring now to FIGS. 2 and 3, there is shown in FIG. 3 a top view of a half portion of the frame 10 shown in FIG. 2. The other half is symmetrically the same. Each pair of idler wheels 22, 24, 34 and 44 is spaced from one another so as to give good support to the tracks 8 while maintaining a certain engagement with them in order to reduce their lateral skid.

Referring again to FIGS. 1 and 2, this engagement is maintained by providing the tracks 8 with inwardly projecting pairs of spaced lugs 54 set equally apart from one another on their entire length such that there is always a pair of lugs 54 guiding each of the tracks 8 on these idler wheels 22, 24, 34 and 44.

Figure 5:
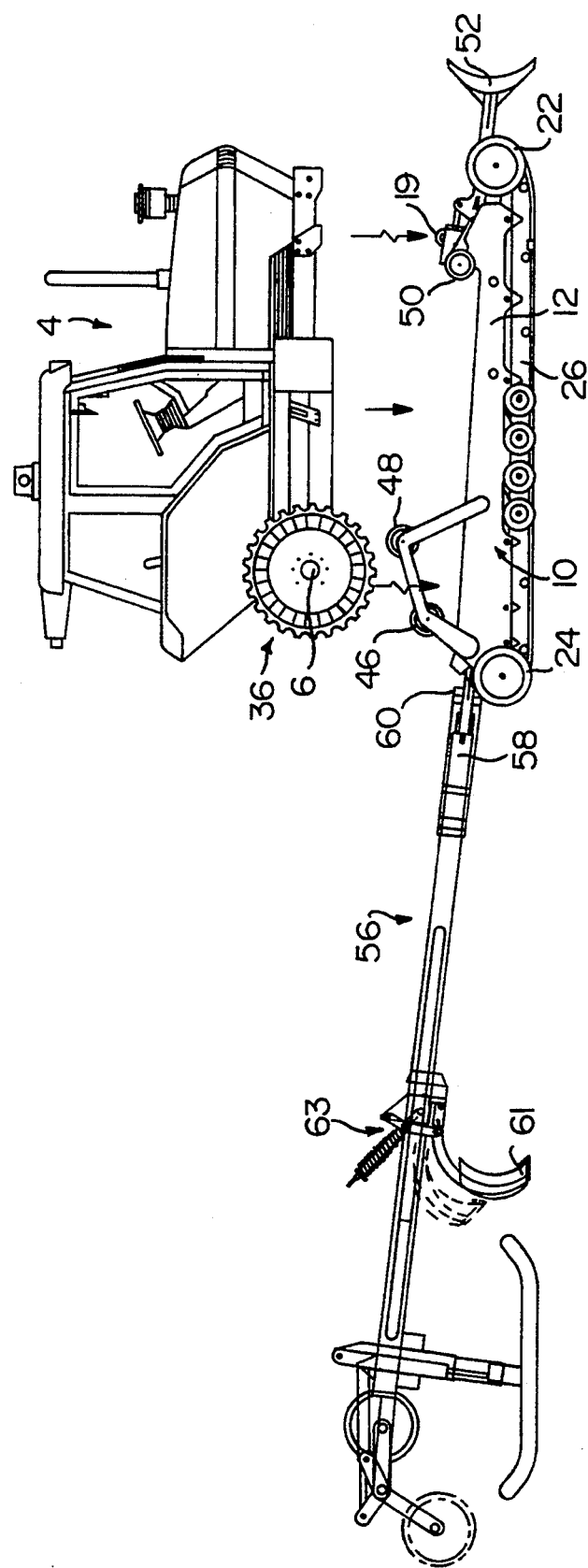
FIG. 5 is a side elevational view of the vehicle and the attachment shown in FIG. 2, to which is also hitched up a plow, showing how the vehicle is adapted to the attachment.

Referring now to FIG. 5, it is shown how the attachment 2 is mounted by firstly fixedly attaching the sprocket wheels 36 to the drive shaft 6 of the tractor 4, secondly placing the tractor 4 onto the attachment 2 and securing the front axle 18 of the tractor 4 to the front beam 14 (shown in FIG. 1 and 2) and bolting the pair of hooks 20 (shown in FIG. 1) to corresponding hooks of the tractor 4, and thirdly setting the tracks (not shown) around each side members 12.

As mentioned earlier, the attachment 2 is especially useful for converting a simple tractor into a snow grooming vehicle when combined with a special type of rear snow plow 56 having a hydraulic piston 58 that can produce a lever action to force a rotation between the plow 56 and its coupling 60 to the attachment 2 for steering the vehicle. The use of slides 26 for guiding the tracks 8 (not shown) instead of conventional idler wheels increases significantly the vehicle's stability, even on bumpy ground. By means of the slides 26, the tracks 8 always lay on top of the bumps without falling into the troughs therebetween. The tractor 4 being almost perfectly stable, the plow 56 towed by the tractor 4 operates best for grading the snow. The low number of structural parts forming the attachment 2 results in an overall improved reliability since there are less parts that may break down.

The plow 56 has a grading blade 61 provided with a retractile system 63 for protecting the blade 61 from potentially abusive impacts caused for example by rocks, stumps, etc. The grading blade 61 is also provided with an inclination system 65 (shown in FIG. 7) for adjusting an angle of grading with respect to a horizontal plane of the plow 56 in order to reduce centrifugal forces occurring when the vehicle turns and maintain a higher grading quality.

Figure 6:
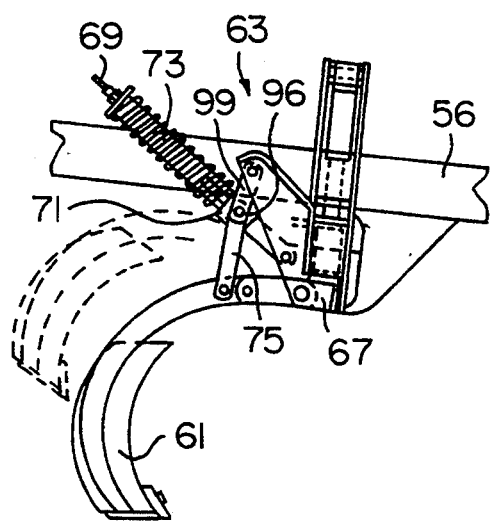
FIG. 6 is an enlarged side elevational view of the retractile system of the grading blade shown in FIG. 5.

Referring now to FIG. 6, the retractile system 63 comprises a bracket 67 attached to the main frame of the plow 56, onto which an end of the grading blade 61 is pivotally connected. The retractile system 63 also comprises a shock absorber assembly including a shaft 69, a sliding sleeve 71, first and second linking members 99, 75, and a spring 73. The shaft 69 has a first end pivotally connected to the bracket 67 and a second end provided with a stop. The sliding sleeve 71 is mounted around the shaft 69 and is capable of sliding therealong. The first linking member 99 has an end pivotally connected to the bracket 67 and another end pivotally connected to the sleeve 71 at point 96. The second linking member 75 has an end pivotally connected to the sleeve 71 at point 96 and another end pivotally connected to the grading blade 61. The spring 73 is mounted along the shaft 69 between its stop and the sleeve so that, in operating position when said grading blade 61 rests against the ground, the shaft 69 is held in a bias position by means of the sleeve 71 which is held at its turn in position by means of the linking members 99, 75 which are slightly skewed with one another.

When the grading blade 61 is brought forward for grading the ground and meets a hard obstacle, it pivots with respect to the bracket 67 so that the grading blade 61 can get over the obstacle while the linking members 99, 75 are folded with respect to each other and the sleeve 71 is moved along the shaft 69 toward the stop to compress the spring 73. Once the obstacle passed the grading blade 61 is automatically brought back to its operating position by means of the spring 73.

By its particular geometry, the retractile system 63 is extremely hard to retract when the grading blade 61 is in operating position, but once engaged the spring 73 absorbs the impact. The grading blade 61 can turn up around the mounting 67 in response to a sufficient retracting force acting thereon, folding then the linking members 99, 75 whose articulations are repelled by the coil spring 73 in opposition to their motion for repositioning thereafter the grading blade 61 in operating position.

Figure 7:
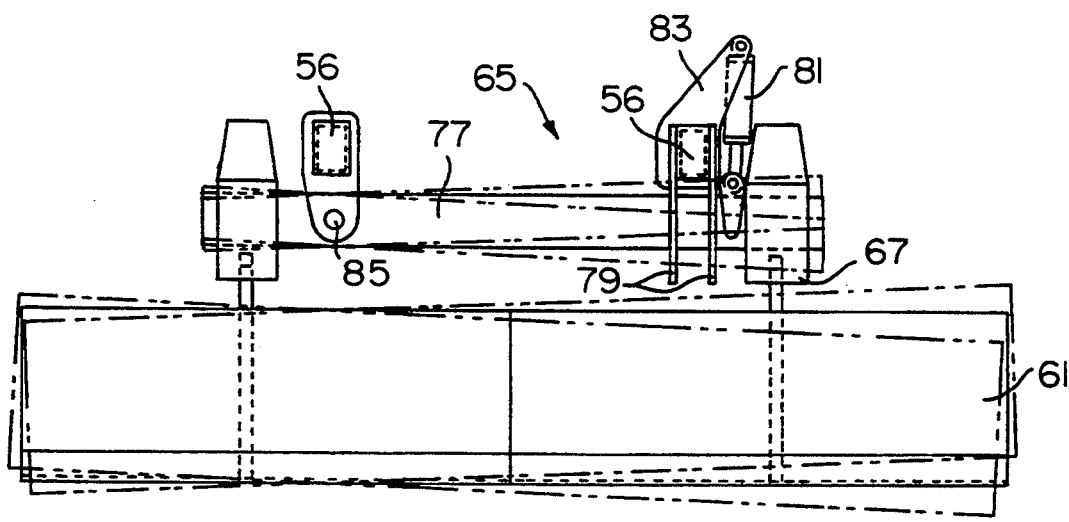
FIG. 7 is a front elevational view of the inclination system of a plow's grading blade according to the present invention.

Referring now to FIG. 7, the inclination system 65 is built upon the same brackets 67 as the retractile system 63 shown in FIG. 6. The inclination system 65 includes an elongated beam member 77 extending crosswise from side to side of the plow 56. The beam member 77 is pivotally connected to one side of the plow 56 so as to pivot around a pivot point 85. The beam member 77 is provided with attaching devices along its length that are spaced apart from each other and attached respectively to different portions of the grading blade 61 so that the latter is solid with the beam member 77. The inclination system 65 further comprises guides 79 fixed to the main frame of the plow 56 and cooperating with the beam member 77, for restricting the beam member 77 to vertical movements. The inclination system 65 further comprises a hydraulic piston 81 having its upper end pivotally connected to a support 83 on the plow 56, and its lower end pivotally connected to the beam member 77 at a predetermined distance from the pivot point 85 in order to obtain the desired lever action. The piston 81 has a hydraulic line supplied by the vehicle's steering mechanism (not shown). The angle of grading can be adjusted via commands on the steering mechanism. When the vehicle enters a turn, the inclination of the grader will be proportional to the action of the steering mechanism, i.e. the sharper the turn the more pronounced the oscillation will be.

Figure 8:
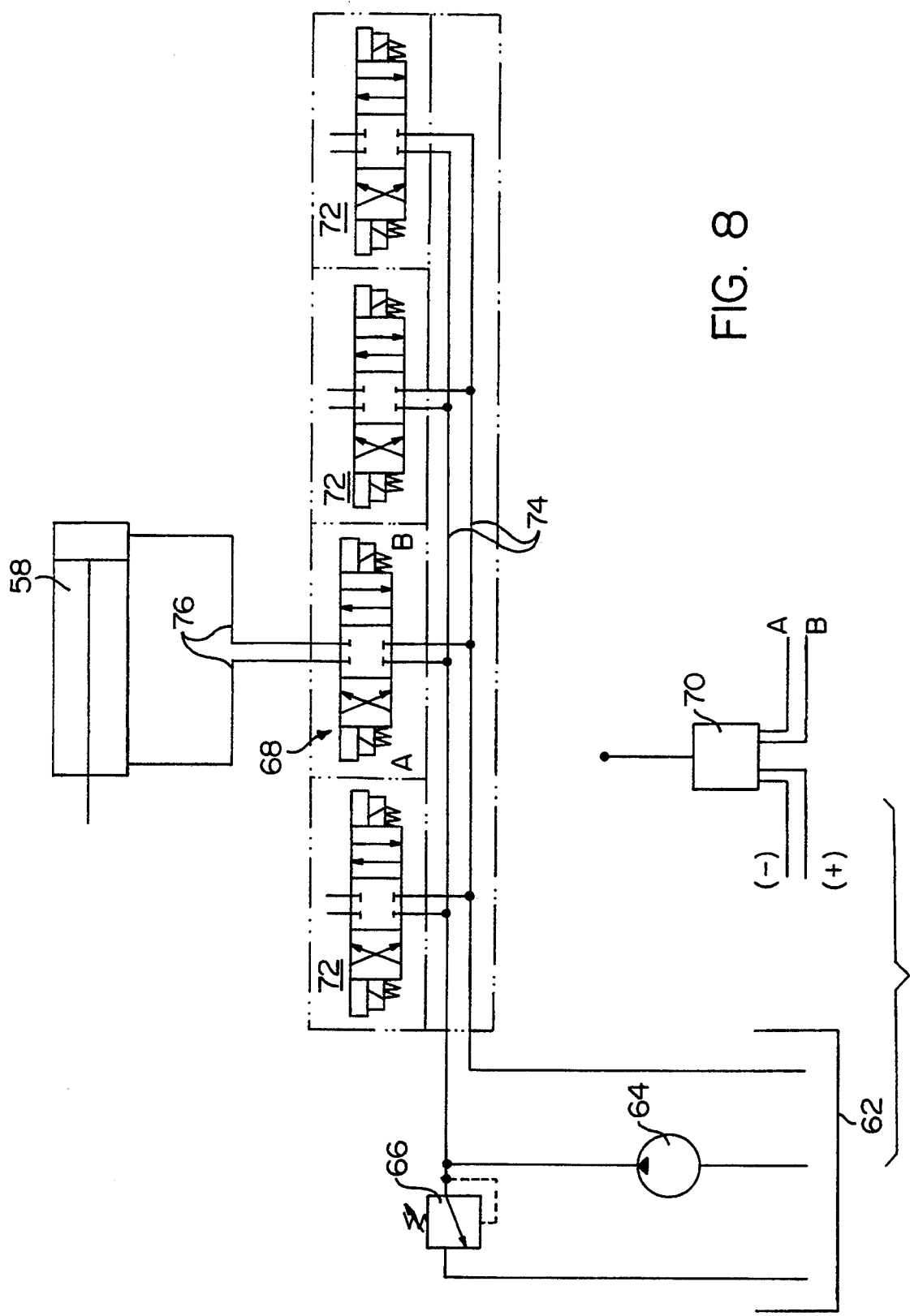
FIG. 8 is a schematic diagram of the hydraulic system of the vehicle combined with an attachment according to the present invention.

Referring now to FIG. 8, there is shown a schematic diagram of a hydraulic system for controlling the hydraulic piston 58. The power steering mechanism of the vehicle comprises a fluid tank 62 that supplies in fluid a hydraulic pump 64 that provides a constant fluid outflow. In idle state of the system, a pressure relief valve 66 regulates the fluid pressure by returning the fluid in the tank 62, while a spool valve 68 is in neutral position and blocks up any flow.

When the hydraulic system is operated, the relief valve 66 shuts off so the fluid is directed through the spool valve 68 to move the hydraulic piston 58 in a direction or the opposite one, depending of a command coming from a schematic representation of a command mechanism 70. This command mechanism 70 can be for instance the power steering mechanism of the tractor 4 (shown in FIG. 4) or any suitable lever installed for that purpose. In that case, a hydraulic line 76 is simply coupled to the power steering mechanism and provides a hydraulic fluid outlet connectable to the hydraulic piston 58 to control.

Depending of the pump force and the fluid quantity, other spool valves 72 can be connected to the hydraulic line 74 for possible connections to other hydraulic vehicle accessories such as the front plow 52 (shown in FIG. 4), and the hydraulic piston 81 of the inclination system 65 (shown in FIG. 7), these accessories being suitably controlled with command mechanisms (such as the command mechanism 70) installed for that purpose.

Figure 9:
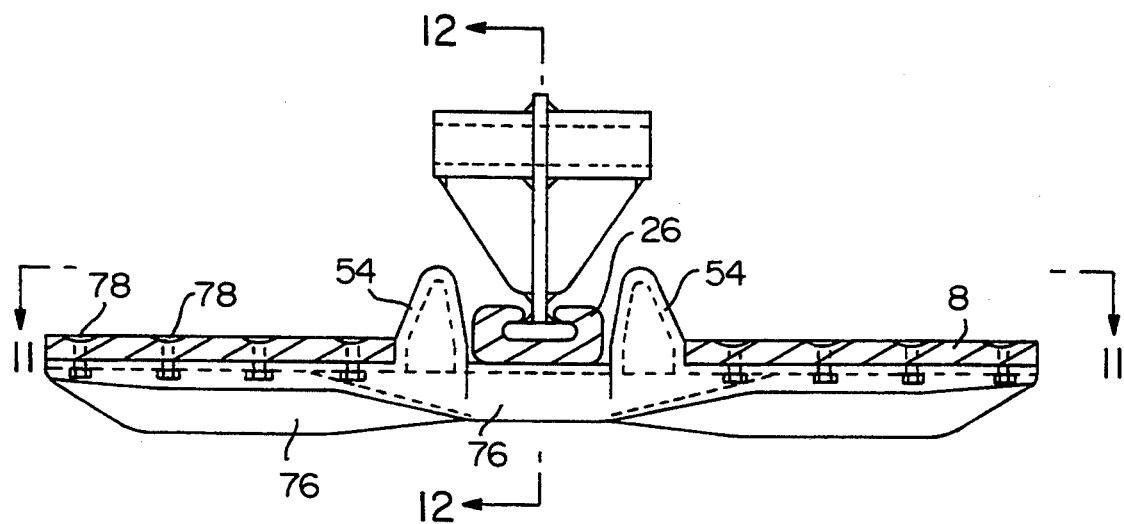
FIG. 9 is a cross-sectional view taken along line 9—9 of the slide and the track shown in FIG. 1.
Figure 10:
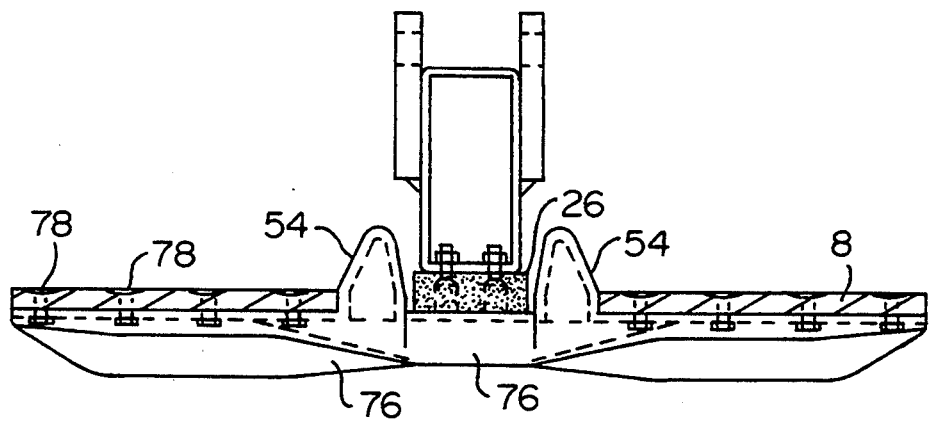
FIG. 10 is a cross-sectional view taken along line 10—10 of the slide and the track shown in FIG. 2.
Figure 11:
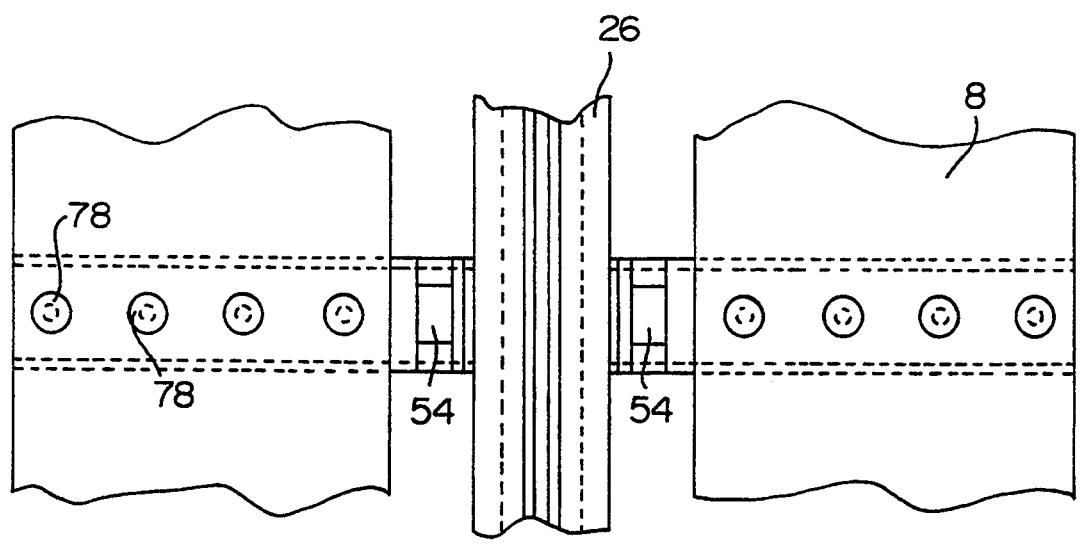
FIG. 11 is a cross-sectional view taken along line 11—11 in FIG. 9.
Figure 12:
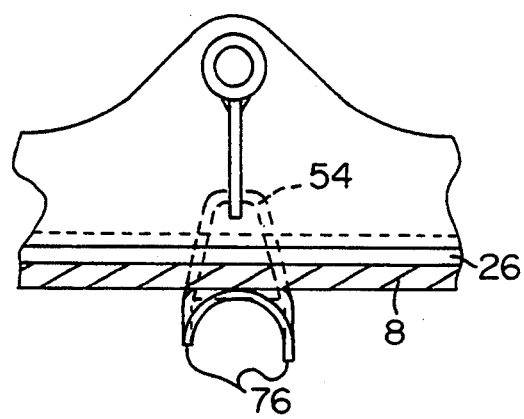
FIG. 12 is a cross-sectional view taken along line 12—12 in FIG. 9.

Referring now to FIGS. 9 and 10, two embodiments of the sleeves 26 are shown. Each of the slides 26 cooperates with the corresponding track 8 for guiding it. Efficient though both embodiments (in respect with FIGS. 1 and 2 respectively) of the slide 26 are, the second embodiment of the slide 26 shown in FIG. 10 is more suitable for attaching sets of track-bearing idler wheels 39 (shown in FIG. 2) thereto. With further references to FIGS. 11 and 12, the pair of lugs 54 are sufficiently spaced apart for allowing passage of the slide 26, but close enough to avoid as much as possible lateral skid. The tracks 8 are along their entire length also provided with outwardly projecting crosswise treads 76 set substantially equally apart from one another to improve the traction of the tracks 8. Each of the treads 76 is secured to the track 8 with bolts and nuts 78.

Figure 13:
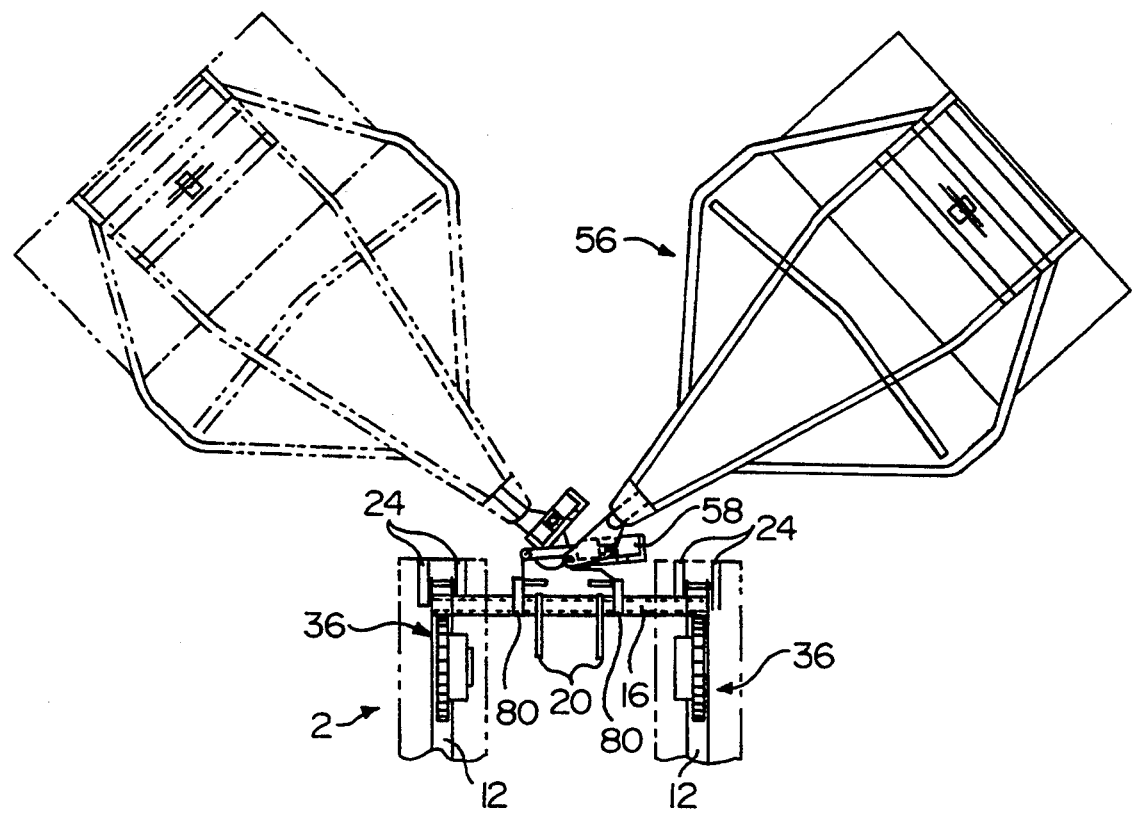
FIG. 13 is a top plan view of the coupling of the plow hitched up to the attachment shown in FIG. 4.

Referring now to FIG. 13, the rear transverse beam 16 is provided with a pair of brackets 80 that are used to hitch up the plow 56 to the attachment 2. The fluid outlet of the hydraulic line 76 coupled to the power steering mechanism (as shown in FIG. 8) of the tractor 4 is located close to the pair of brackets 80 and is connected to the piston inlet. The vehicle can therefore be steered by pivoting the plow 56 with respect to the attachment 2.

Figure 14:
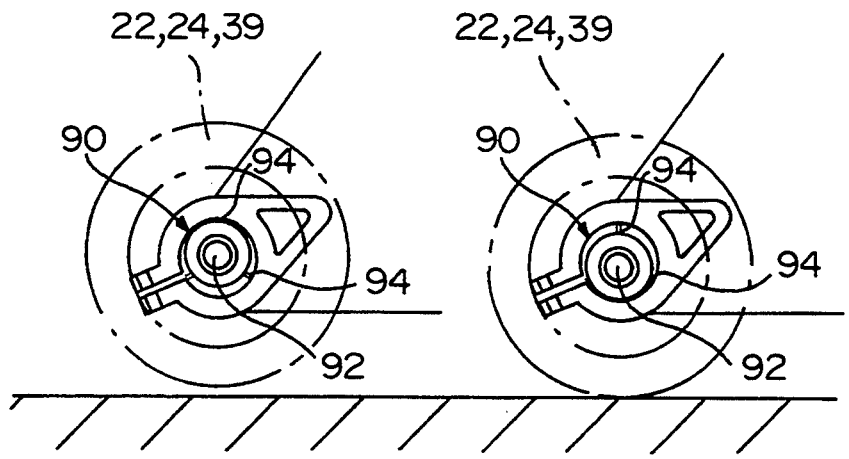
FIG. 14 shows a side elevational view of axle positioning systems according to the present invention.
Figure 15:
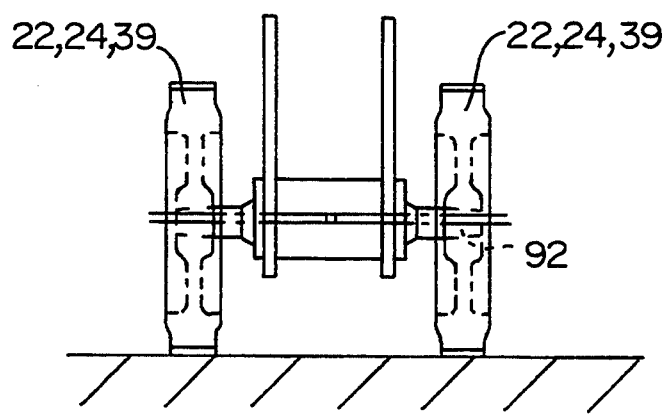
FIG. 15 shows a front elevational view of one of the axle positioning systems shown in FIG. 14.

Referring now to FIG. 14, each of the wheels or set of wheels 22, 24, 39 (as shown in FIG. 1) is provided with a positioning device 90 for adjusting a position of its axle 92 in order to control the slide's wear and improve the smoothness of the track's sliding. The positioning device 90 forms a collar into which the axle 92 is tightened by at least three locking elements 94 inwardly projecting from the collar in converging directions at 120° from one another. The position of the wheel 22, 24, 39 can be adjusted by varying respectively the projecting portions of the locking elements 94 within the collar.

Although the present invention has been explained hereinabove by way of preferred embodiments thereof, it should be pointed out that any modifications to these preferred embodiments within the scope of the appended claims is not deemed to change or alter the nature and scope of the present invention.

What is claimed is:

1. A caterpillar track attachment adaptable to a vehicle having a drive shaft and a steering mechanism, comprising:

a pair of endless caterpillar tracks for propelling said vehicle;

a frame for supporting said vehicle, said frame having securing means for connecting said vehicle onto said frame, and a pair of spaced apart elongated side members around which the tracks are respectively mounted, each of said members having front and rear sets of wheels located substantially at its front and rear extremities for guiding therearound the corresponding track, and straight slide means located at its lower portion between the corresponding rear and front sets of wheels for guiding the corresponding track, said slide means having a substantially flat elongated lower surface slidingly engaging an inside surface of the corresponding track;

drive means for transmitting motive power from said drive shaft to said tracks, said drive means being operatively connectable to said drive shaft and engaging said tracks; and hydraulic means connectable to said steering mechanism for providing at least one hydraulic fluid outlet controlled by commands from said steering mechanism;

whereby said attachment is adaptable to said vehicle by operatively connecting said drive means to said drive shaft, by connecting said frame to said vehicle by said securing means, and by coupling said steering mechanism to said hydraulic means.

2. Attachment according to claim 1, wherein said drive means comprise a pair of drive wheels, each of said drive wheels being fixedly attached substantially at a corresponding end of said drive shaft in direct linkage therewith and in alignment with the corresponding one of said tracks.

3. Attachment according to claim 1, wherein each of said members has guiding means engaging the corresponding track at its upper portion, for guiding the corresponding track during its course.

4. Attachment according to claim 1, wherein said members have stretch adjusting means for adjusting a stretch of said tracks, each of said stretch adjusting means including a telescopic arm having an end connected to the corresponding member, and a pair of coaxially aligned idler wheels attached to an opposite end of said telescopic arm, each of said telescopic arms having an adjustable length which is adjustable for pressing up the corresponding pair of idler wheels against the corresponding track to produce a desired stretch thereof.

5. Attachment according to claim 1, wherein said members have stretch adjusting means for adjusting a stretch of said tracks, each of said stretch adjusting means including a telescopic arm having an end connected to the corresponding member, and an opposite end to which is mounted the corresponding front set of wheels, each of said telescopic arms having an adjustable length which is adjustable for pressing up the corresponding front set of wheels against the corresponding track to produce a desired stretch thereof.

6. Attachment according to claim 2, wherein each of said tracks has along its entire length tooth-receiving holes substantially equally apart from one another, and each of said drive wheels is a sprocket wheel having a peripheral set of teeth adapted to be in gearing engagement with said tooth-receiving holes of the corresponding track.

7. Attachment according to claim 6, wherein each of said sprocket wheel has a one-piece hub around which are mounted a plurality of arc pieces forming a rim, each of said arc pieces being provided with some of said teeth for forming said set of teeth when all of said arc pieces are mounted around said hub.

8. Attachment according to claim 6, wherein each of said sprocket wheels has a one-piece hub around which is mounted a one-piece rim provided with said set of teeth, said rim being made of a polyurethane plastic and an aluminum alloy.

9. Attachment according to claim 1, wherein said frame has front and rear transverse beams joining each of said side members, said securing means being located on said front and rear transverse beams, the securing means on said front beam being arranged for receiving a front portion of said vehicle, and the securing means on said rear beam including a pair of hooks for bolting thereto a rear portion of said vehicle.

10. Attachment according to claim 9, wherein said rear beam is provided with a pair of brackets extending rearwards therefrom for hitching up a plow to said attachment, and said hydraulic fluid outlet is positioned close to said pair of brackets for connecting a hydraulic accessory of said plow to said outlet.

11. Attachment according to claim 1, wherein each of said sets of wheels are a pair of coaxially aligned idler wheels.

12. Attachment according to claim 1, wherein said slide means are slides, and each of said tracks is along its entire length provided with inwardly projecting pairs of spaced lugs mounted substantially equally apart from one another, between which the corresponding one of said slides passes to guide the corresponding one of said tracks.

13. Attachment according to claim 3, wherein said guiding means are slides or pairs of coaxially aligned idler wheels.

14. Attachment according to claim 1, wherein each track is along its entire length provided with outwardly projecting crosswise treads set substantially equally apart from one another.

15. Attachment according to claim 12, wherein said members are further provided with sets of track-bearing idler wheels attached at predetermined locations on both sides of said slides on their lower portion.

16. Attachment according to claim 10, in combination with said plow, wherein said plow has a main frame and a grading blade attached to said plow by means of a retractile system comprising:
a bracket attached to said main frame of the plow, onto which an end of said grading blade is pivotally connected;
a shock absorber assembly including a shaft having a first end pivotally connected to said bracket and a second end provided with a stop, a sliding sleeve mounted around said shaft and capable of sliding therealong, a first linking member having an end pivotally connected to said bracket and another end pivotally connected to said sleeve, a second linking member having an end pivotally connected to said sleeve and another end pivotally connected to said grading blade, and a spring mounted along said shaft between said stop and said sleeve so that, in an operating position when said grading blade rests against the ground, said shaft is held in a bias position by means of said sleeve which is held in position by means of said linking members which are slightly skewed with one another;
whereby, when said grading blade is brought forward for grading the ground and meets a hard obstacle, said grading blade pivots with respect to said bracket so that said grading blade gets over said obstacle while said linking members are folded with respect to each other and said sleeve is moved along said shaft toward said stop to compress said spring; and when said grading blade has gotten over said obstacle, said grading blade is brought back to said operating position by means of said spring.

17. Attachment according to claim 10, in combination with said plow, wherein said plow has a main frame and a grading blade attached thereto by means of an inclination system for adjusting an angle of grading with respect to a substantially horizontal plane defined by said plow, said inclination system comprising:
an elongated beam member extending crosswise from side to side of said plow, said beam member being provided with attaching means along its length that are spaced apart from each other, said attaching means being respectively attached to different portions of said grading blade so that said grading blade is solid with said beam member, said beam member being pivotally connected to said plow at a pivot point thereof;
guiding means fixed to said main frame and cooperating with said beam member, for restricting said beam member to vertical movements; and
a hydraulic piston having an upper end pivotally connected to said plow, and a lower end pivotally connected to said beam member at a predetermined distance from said pivot point, said piston having a hydraulic line to be connected to a hydraulic outlet of said hydraulic means, said hydraulic outlet being controlled by said commands;
whereby said angle of grading is adjustable via said commands.

18. Attachment according to claim 15, wherein each of said wheels or set of wheels is provided with a positioning device for adjusting a position of its axle, said positioning device forming a collar into which the corresponding axle is tightened by at least three locking elements inwardly projecting from said collar in converging directions at 120° from one another, whereby said position of the corresponding wheel or set of wheels is adjustable by varying respectively projecting portions of said locking elements within said collar.

* * * * *